Dec. 27, 1949      E. BERG      2,492,258
BROODER
Filed Nov. 15, 1945      2 Sheets-Sheet 1
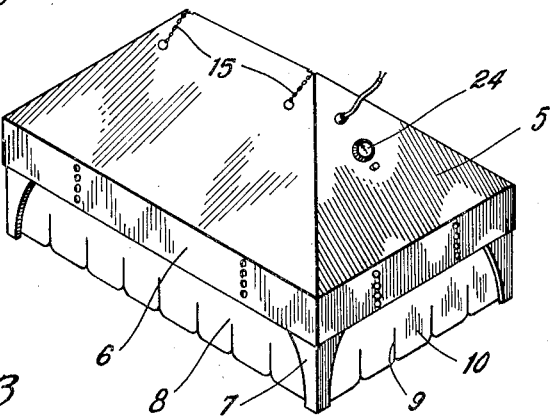
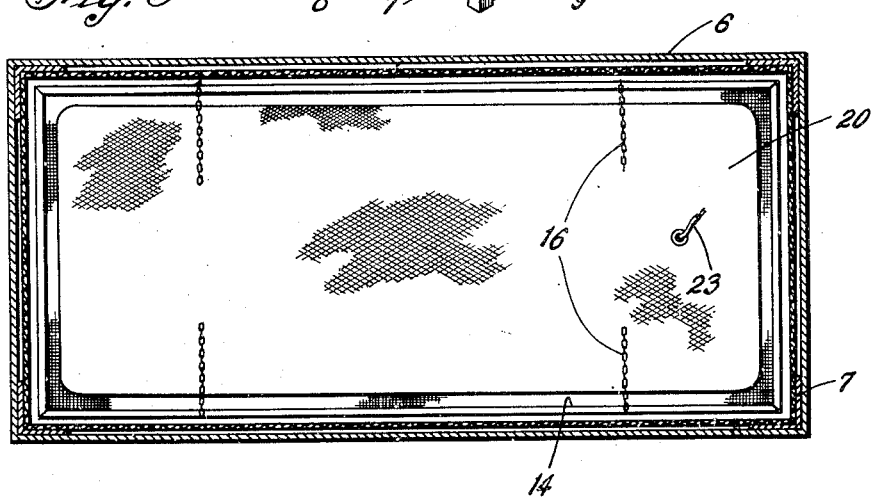
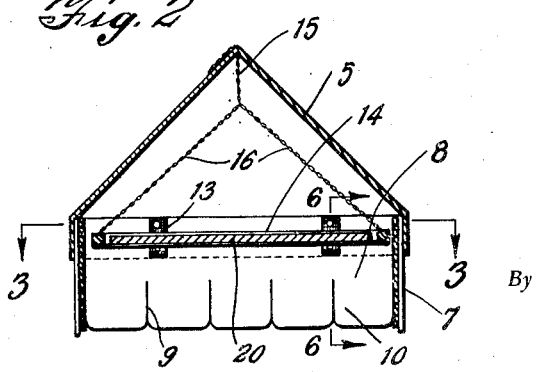
Inventor
*Ezra Berg*

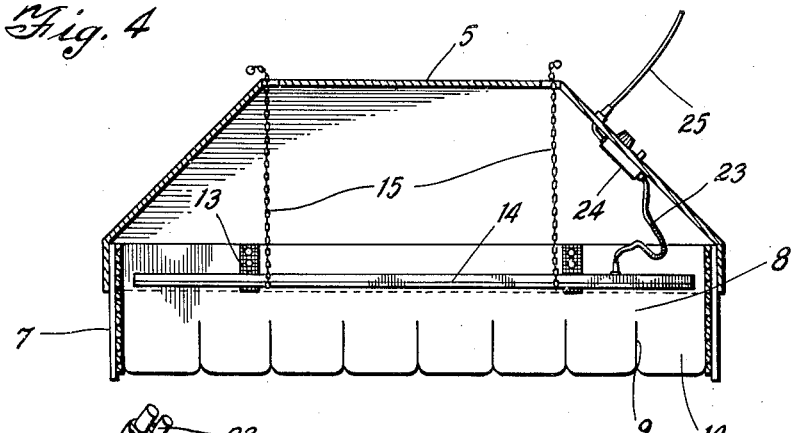
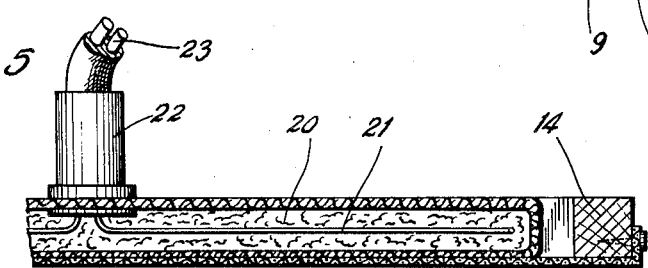
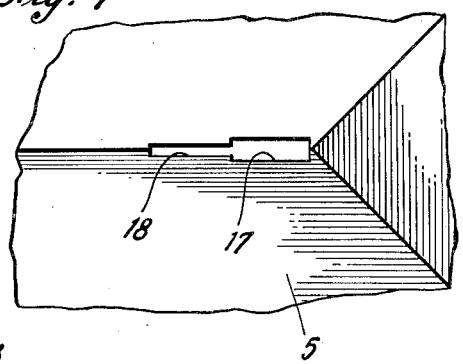
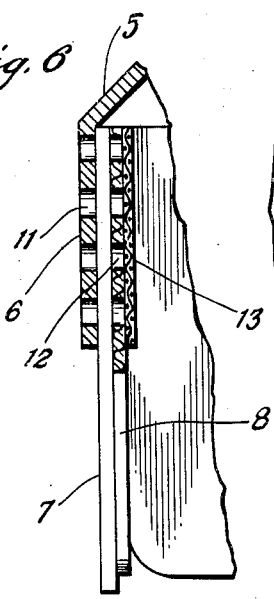

Patented Dec. 27, 1949

2,492,258

UNITED STATES PATENT OFFICE 2,492,258

BROODER

Ezra Berg, Evanston, Wyo.

Application November 15, 1945, Serial No. 628,778

1 Claim. (Cl. 219—35)

The present invention relates to new and useful improvements in brooders for baby chicks, turkeys and other poultry and more particularly to a heating element for the brooder.

An important object of the present invention is to provide a thermostatically controlled electric heating unit which is adapted to heat the enclosure in which the poultry is housed and by means of which the heat is uniformly distributed throughout the entire area of the brooder whereby to eliminate the crowding of the poultry in one spot in order to derive the benefit of the heated air.

A further object of the invention is to provide an electric heating unit for brooders in which the electric heating element is enclosed within a flexible cloth pad to prevent direct contact of the chicks with the heating element.

A still further object of the invention is to provide means for adjusting the heating element to compensate for the gradual growth of the chicks.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view.

Figure 2 is a vertical transverse sectional view.

Figure 3 is a horizontal sectional view taken substantially on a line 3—3 of Figure 2.

Figure 4 is a longitudinal sectional view.

Figure 5 is an enlarged fragmentary sectional view of the heating element and adjustable frame supporting the same.

Figure 6 is an enlarged fragmentary vertical sectional view taken substantially on a line 6—6 of Figure 2, and Figure 7 is an enlarged fragmentary top plan view showing the slot in the top of the brooder for securing the adjusting chains in vertically adjusted position.

Referring now to the drawings in detail wherein for the purpose of illustration I have disclosed a preferred embodiment of the invention, the numeral 5 designates the hood of the brooder which is constructed of any suitable rigid material preferably of a hip roof type and having its edges provided with a skirted portion 6.

The hood is supported in an elevated position by means of legs 7 at the corners thereof and to the inside of the skirted portion 6 of the hood is secured a flexible curtain 8 having vertical slits extending upwardly at spaced intervals from its lower edge as shown at 9 to provide a plurality of flaps 10 at the lower edge of the curtain to facilitate passage of the baby chicks into and out of the brooder.

The sides and ends of the skirted portion 6 are formed with a plurality of ventilating openings 11 which register with similar openings 12 in the curtain 8, the openings being covered at their inside by a screening 13.

A heating element supporting frame 14, preferably of light weight wood, is supported in a horizontal elevated position in the brooder by means of a pair of chains 15 having diverging section 16 at their lower ends which extend to the opposite sides of the frame as shown to advantage in Figure 2 of the drawings. The upper ends of the chains 15 extend through longitudinally extending slots 17 formed in the peak of the hood and from one end of which extends a re-entrance slot 18 of reduced width as shown in Figure 7 of the drawings. The links of the chain 15 are adapted to freely pass through the larger portion of the slots 17 and when moved laterally into the reduced re-entrance slot 18 the cross links of the chain are held in vertically adjusted position.

To the lower edge of the frame 14 is secured a wire screen 19 and on which is supported a flexible heating pad 20 having an electrical heating element 21 embedded therein, the pad being constructed similar to the conventional electric heating pad or blanket.

The electric heating element 21 extends through a socket 22 at the top of the pad and to which the circuit wires 23 are attached leading to a dial type thermostatically controlled switch 24 on the outside of the hood of the brooder and to which the extension cord 25 is also connected.

In the operation of the device the brooder is supported on the legs 7 and is heated by the electric heating pad 20 supported on the frame 14.

The pad 20 prevents direct contact of the baby chicks with the electric heating element 21 and at the same time the inside of the brooder is uniformly heated so that crowding of the chicks toward one spot of the brooder is avoided.

During the growth of the chicks the frame 14 may be vertically adjusted by raising the chains 15 and securing the chains in their adjusted position in the re-entrance slot 18 at the top of the brooder.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

What is claimed is:

A chicken brooder including a hood having an edge skirt surrounding the same, legs supporting the hood and skirt at elevated position, a curtain of flexible material fixed to the inner side of the skirt to depend therefrom and form an open bottom enclosure, said skirt and curtain having registering ventilating openings therein, screening covering said openings, and an electric heating pad suspended horizontally from said hood in the upper portion of said enclosure and spaced at its edges from said curtain to permit air in the enclosure to rise upwardly past said pad, said curtain having vertical slits therein dividing the same at its lower edge into vertical flaps to facilitate passage of chickens into and out of the enclosure.

EZRA BERG.

REFERENCES CITED

The following references are of record in the file of this patent:

UNITED STATES PATENTS

| Number | Name | Date |
| --- | --- | --- |
| 1,344,452 | Roth | June 22, 1920 |
| 1,673,334 | Landgraf | June 12, 1928 |
| 1,720,758 | Borden | July 16, 1929 |
| 1,918,125 | Petersime | July 11, 1933 |
| 2,358,081 | Marick | Sept. 12, 1944 |